United States Patent Office 3,677,936
Patented July 18, 1972

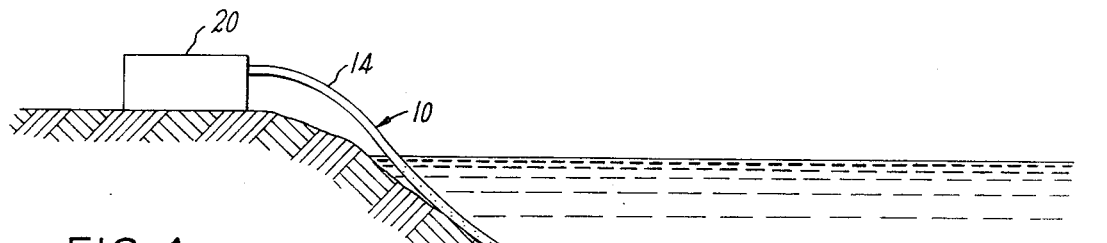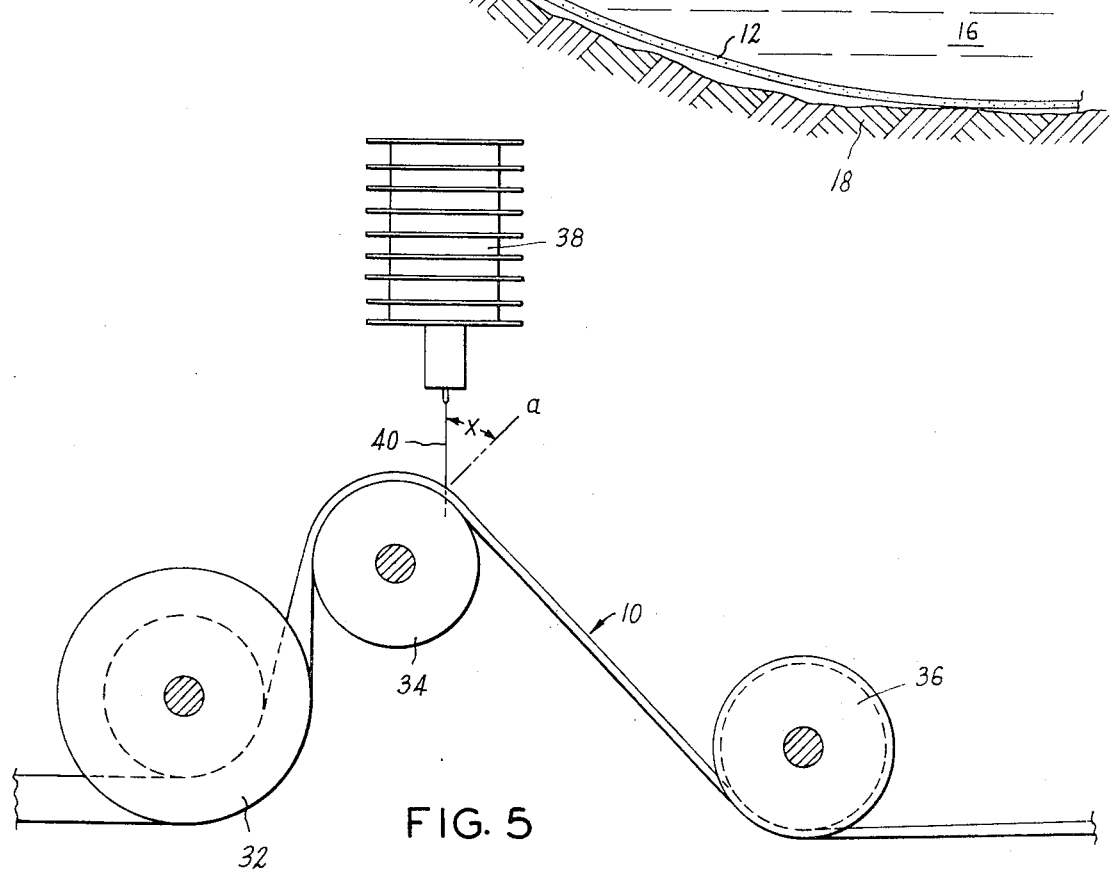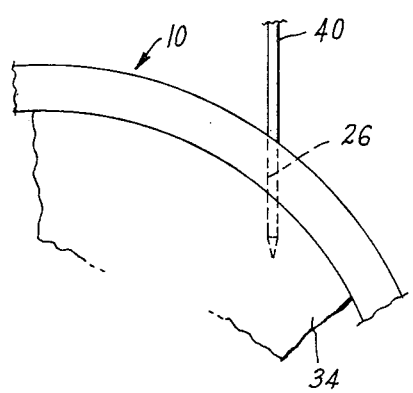

3,677,936
LIQUID TREATMENT METHOD
Abraham G. Bastiaanse, 162 Main St.,
Unionville, Conn. 06085
Filed Mar. 10, 1971, Ser. No. 122,749
Int. Cl. C02c 1/02
U.S. Cl. 210—15                                   3 Claims

ABSTRACT OF THE DISCLOSURE

A system for treating liquid bodies with a gas employs a diffusion member that comprises a hose of relatively resilient material having formed therein a multiplicity of minute, normally closed perforations. The perforations extend through the wall of the hose at an angle that is at least 25 degrees from normal to the surface thereof, and they are produced with the removal of substantially no material.

BACKGROUND OF THE INVENTION

It is well known that the ecology of lakes, streams and other waterways depends to a large degree upon the bacteriological activity occurring therein. In many instances, water pollution is the direct result of inadequate biological activity which, in turn, is caused by a deficiency of oxygen in the body of water. Accordingly, it has been proposed that a desirable ecological balance may be restored or established in polluted water by supplying oxygen thereto by aeration techniques but, as far as is known, this approach has not encountered significant success. This is believed to be primarily due to the absence of a practicable system for effecting the aeration of large bodies of water efficiently and on an economically feasible basis.

One of the greatest problems in designing a system for treatment of water is that of providing gas/liquid contacting means that does not become clogged or fouled and is capable of operating for long periods of time with virtually no maintenance. Bubble-heads or grids made of porous minerals and metals have been employed at the gas/liquid interface in various systems, but they have proven quite impractical for the treatment of polluted water. This is because both microscopic and macroscopic particles and organisms find ready access into the pores of such devices when the flow of gas is terminated, soon rendering the system more or less inoperative until such time as the device may be replaced or cleaned. In the vast installations necessary for pollution control, replacement and cleaning of the apparatus would represent an undertaking of major proportions.

Gas diffusion devices constructed of resilient materials have been proposed in an effort to provide flow openings that limit the entry of water therethrough after termination of the gas flow. For example, Coppock, in U.S. Pat. No. 3,063,689, has suggested the use of an elongated chamber of resilient material having, as the outlet for the gas, perforations formed in the wall of the chamber substantially without the removal of material. In accordance with the invention of the patent, the perforations are formed in a generally normal direction through the wall (although they amy be at an angle to the axis of the chamber) and the chamber has a supporting member therewithin comprising a rigid elongated member of non-circualr (and preferably oval) cross section. However, this type of device would tend to leak and thereby admit water-borne impurities at the relatively high pressures that exist at or near the bottom of all but the shallowest bodies of water. This is particularly true since the device is of noncircular cross-section, due to the inequality of the forces acting thereon, and because the perforations shown are slits having a significant dimension as well as extending generally normally through the wall of the chamber.

A second major problem that exists in the provision of a practicable system for use in treating large bodies of water is, of course, that of expense. The prior art systems tend to be relatively complex, and to rely upon diffusion members that are assembled of several different parts. The expense involved in installing and maintaining a network comprised of such structures to treat the vast expanses of water presently in need thereof would be of very great magnitude.

Accordingly, it is the primary object of the present invention to provide a novel system for the treatment of liquids with gases, which employs a diffusion member capable of high gas flow rates and in which the pores are effectively sealed against the entry of water and impurities, when the flow of gas therethrough is terminated.

It is also an object of the invention to provide such a system that may be used effectively and efficiently for the treatment of large bodies of water, and that requires no added structural members for support against collapse under relatively high hydrostatic pressures.

Another object is to provide a system having the foregoing advantages and features which is relatively simple and inexpensive to install and to maintain.

Still another object of the invention is to provide a novel, relatively simple and inexpensive method for the treatment of liquids with gases.

SUMMARY OF THE INVENTION

It has now been found that the foregoing and related objects of the invention can be readily attained in a system for the treatment of liquid bodies with a gas, including a diffusion member comprising a substantially cylindrical hose of relatively resilient material having thereabout and over substantially the entire length thereof a multiplicity of minute, normally closed perforations. Substantially all of the perforations extend through the wall of the hose at an angle that is at least about 25 degrees from normal to the surface thereof, and such perforations are produced with the removal of substantially no material. The system also includes a source of gas under pressure, and means connecting the gas source to the diffusion member to pass gas into the interior of the hose. The perforations in the hose provide the sole outlet for gas from the diffusion member, and distend under pressure therewithin to permit the passage of gas outwardly therethrough.

Preferably, the hose is substantially free of added support structure for preventing the collapse thereof under external liquid pressure; most desirably the hose is fabricated of a natural or synthetic elastomeric material, the wall thickness thereof is about ⅛ to ½ inch, and the outside diameter thereof is about ½ to 2 inches. The perforations of the hose are desirably of circular cross-section, and the angle thereof is preferably at least about 35 degrees from normal to the wall surface. In the system, the gas source may be an air compressor, the connecting means may comprise an unperforated section of the hose at one end thereof, and the diffusion member may comprise a plurality of such hoses interconnected for passage therethrough of gas from the gas source.

Certain objects of the invention are attained in a method for the treatment of a liquid body with a gas, wherein the wall of a resilient, substantially cylindrical hose member is perforated at a multiplicity of points and at an angle of at least about 25 degrees from normal to the surface thereof. A multiplicity of minute, normally closed perforations extending through the wall of the hose member, at an angle that is at least about 25 degrees from normal to the surface thereof, are thereby formed about the hose member and over substantially its entire length. The hose member is submerged in the liquid body to be treated, and a gas is passed under pressure through the hose member while substantially blocking any exits for the gas other than the perforations therein. This causes distension of the perforations and permits passage of the gas outwardly therethrough into liquid. Thereafter, the flow of gas through the hose member is terminated, whereupon the pressure of the liquid bearing upon and normal to the surface of the wall of the hose member about the outer edges of the perforations, tightly closes the perforations and substantially prevents the entry of foreign matter from the liquid thereinto.

Preferably, the method is effected by puncturing the wall of the hose member at an angle of at least about 35 degrees from normal to the surface thereof, and the puncturing step is carried out with the hose member in a stretched condition. Normally the gas employed will be air and the liquid body will be a large body of water, the method being carried out to promote bacteriological activity in the water by oxygenation of the bacteria therein.

BRIEF DESCRIPTION OF THE DRAWINGS

FIG. 1 is an elevational view of a system embodying the present invention and installed for the aeration of water;

FIG. 5 is a schematic illustration of one embodiment of apparatus that may be employed in the method hereof to produce the perforated hose; and FIG. 6 is a fragmentary view, drawn to an enlarged scale, of the puncturing step performed with the apparatus of FIG. 5.

DETAILED DESCRIPTION OF THE ILLUSTRATED EMBODIMENTS

Figure 2:
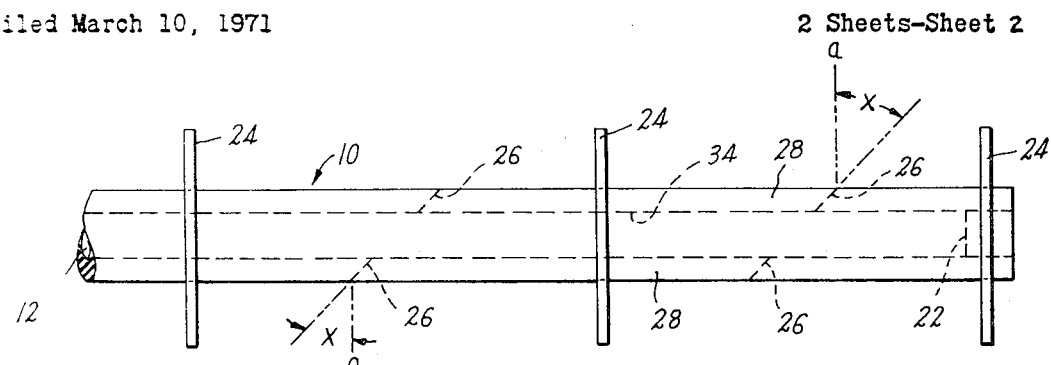
FIG. 2 is a fragmentary elevational view of the perforated end of a hose employed as a diffusion member in the system illustrated in FIG. 1.

Turning now in detail to FIG. 1 of the drawings, therein illustrated is a liquid treating system embodying the present invention and including a hose of relatively resilient material, generally designated by the numeral 10, having a perforated section 12 and an imperforate section 14. The perforated section 12 of the hose 10 is completely submerged under the water 16 to be treated, and rests upon the bottom or bed 18 of the body of water and closely follows the contour thereof. The imperforate section 14 of the hose 10 is connected to an air compressor 20, which is diagrammatically illustrated and includes appropriate driving means (not shown).

Figure 3:
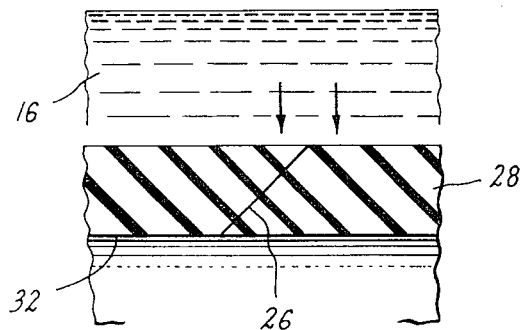
FIG. 3 is a fragmentary section view of a portion of the hose of FIG. 2, drawn to an enlarged scale and showing the single perforation thereof in closed position under hydrostatic pressure.
Figure 4:
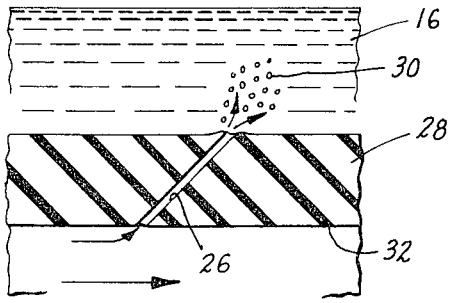
FIG. 4 is comparable to FIG. 3, but showing the perforation distended under internal gas pressure with the gas exiting as bubbles therethrough.

The construction of the hose 10 is more clearly illustrated in FIGS. 2–4, wherein it can be seen that a solid plug 22 is sealingly engaged within the end of the hose 10 opposite to the end thereof providing the imperforate section 14 (which is attached to the compressor 20 in FIG. 1). Annular weights 24 are mounted along the length of the hose 10 about its exterior to provide added weight and to counteract the buoyancy of the gas, thus ensuring that the hose 10 will be along the bottom of the body of water and follow the contour thereat.

A multiplicity of perforations 26 are formed through the wall 28 of the hose 10 at locations thereabout and therealong. The perforations 26 are formed with the removal of substantially no material from the wall 28, and are depicted in somewhat enlarged dimensions for the purpose of illustration. The perforations 26 extend through the wall 28 at an angle $x$ relative to an imaginary axis $a$ normal to the surface of the wall 26, and in accordance with the invention the angle $x$ is at least about 25 degrees; in the illustrated embodiment, $x$ is approximately 45 degrees, as is most preferred. By virtue of the angular attitude of the perforations 26, the pressure of water 16 bearing equally over the entire outer surface of the hose 10 (as suggested by the arrows in FIG. 3) effectively closes the perforations 26 and thereby prevents the entry of water and of microscopic and macroscopic particles and organisms therethrough. As is seen in FIG. 4, the pressure of air passing (as suggested by the arrows) through the passageway 32 of the hose 10 causes the perforation 26 to open, permitting the air to flow outwardly therethrough and pass as bubbles 30 into the water 16 for the treatment thereof. Thus, the resiliency of the hose material causes the perforations 26 to function as one-way valves, distending under internal pressure that tends to stretch the material, and closing under the compressive external pressure of the water acting thereupon at an angle to the axis of the perforations rather than coaxially therewith.

Turning now to FIGS. 5 and 6, the apparatus depicted therein is suitable for use to produce the perforations 26 in the hose 10 at the desired angular attitude $x$. The apparatus consists of a series of rolls that are arranged to stretch the hose 10 to ensure that the perforations 26 are produced with the removal of substantially no material. From a feed roll (not shown) the hose 10 passes in a relatively relaxed condition about an idler roll 32, and thereafter between a backup roll 34 and a tension roll 36. The tension roll 36 rotates at a relatively fast rate (compared to the feed roll and the take-up roll, also not shown), which maintains the portion of the hose 10 between it and the back-up roll 34 in a stretching condition. The back-up roll 34 is constructed of a relatively soft and/or resiliently deformable material to accommodate the needle 40 used to puncture the hose 10, and so as to ensure its passage entirely through both walls thereof. The needle 40 is mounted by appropriate means upon an armature 42 which is, in turn, positioned in the magnetic field of the coil of a solenoid 38. The solenoid 38 is actuated intermittently (by means not shown) to reciprocate the needle 40 and thereby to produce a multiplicity of perforations in the hose 10. If so desired, means for turning the hose during passage over the back-up roll 34 may be provided to vary the circumferential locations of the perforations produced.

The hose employed as the diffusion member, in accordance herewith, is circular in cross-section to enable it to withstand considerable external pressure without collapse, even though it is necessarily constructed of a resilient material. The ability of the hose to withstand the external pressures will, of course, also depend upon the particular material from which it is fabricated as well as upon the thickness of the wall and the overall diameter thereof. For most applications, hoses ranging from about ⅛ to ½ inch in wall thickness and having outside diameters of about ½ to 2 inch will generally be appropriate. It will be appreciated that the dimensions of the several hoses that may comprise a single diffusion member may vary to enhance the flow and distributional characteristics of the system. However, one of the outstanding advantages of the present invention resides in the fact that the normally closed condition of the perforations of the hose results in the equalization of pressures throughout the system before any gas flows outwardly therefrom. This in and of itself, promotes uniformity in the gas flow pattern and a desirable distributional effect.

As will be appreciated, the manner in which the perforations of the hose are formed and the angular attitude thereof are of utmost importance to the successful practice of the present invention. Thus, the perforations must be produced by puncturing to avoid substantially the removal of any material of the hose, and they must extend at an angle of at least about 25 degrees from normal to the wall surface. Preferably the angle is at least 35 degrees relative to normal to the wall surface, and ideally it is about 45 degrees relative thereto. These two factors, coupled with the resiliency of the hose material, provide a very effective oneway valve action which ensures outward flow of the gas at adequate volumetric rates while at the same time preventing the entry of water and water-borne impurities, even under high hydraulic pressures. If the angle of the perforations is less than about 25 degrees from normal to the wall surface, the effect of the water pressure will generally be inadequate to provide the full benefits of the invention.

The perforations in the hose must extend not only along the length thereof, but are also desirably provided substantially entirely thereabout, since it is important that the gas be discharged in substantially all directions to ensure complete treatment of the surrounding body of water. It is particularly important that a portion of the gas be directed downwardly, since a large proportion of the inactive bacteria will normally reside along the bottom of the body of water, as will a major portion of the polluting matter.

The natural rubbers and synthetic elastomers (generically referred to herein as "elastomeric materials") are most appropriately employed for the diffusion member. Not only do they provide the necessary resiliency for the valve action, but they also allow conformity to uneven terrain, are generally quite resistant to deterioration under the conditions of use, and require little or no maintenance during long periods of use. Typical elastomic materials that may be employed as the hose material include neoprene, chloroprene, silicone, nitrile, butadiene and butadiene styrene rubbers, as well as other natural and synthetic polymers that will occur to those skilled in the art.

Other than a gas source, which is desirably a compressor but which may also be provided by bottled gas or the like if a gas other than air is employed, the system requires nothing more than means to interconnect the gas supply to the hose. Such means may be provided by an imperforate section of the hose, as has been pointed out with respect to the drawings. However, different interconnecting means and other elements may be included in the system, an example of which are the weights illustrated in FIG. 2 of the drawings. The end plug 22 shown in the same figure may be dispensed with if the end of the hose is crimped, bonded or sealed by other means, and it should be appreciated that a branched arrangement of a multiplicity of hoses will frequently be appropriate to provide the desired flow configuration or bubble curtain pattern in certain bodies of water, in which event appropriate adapters, fittings, and the like will be utilized.

Although the present invention is most valuably applied to the aeration of water for pollution control, and that application has been stressed throughout, the concepts hereof are not so limited. Thus, the system and method described may be used to treat water with other gases, such as chlorine, high purity oxygen, etc., or to treat liquids other than water to promote or effect chemical reactions therein or for other purposes.

Accordingly, it can be seen that the present invention provides a novel system and method for the treatment of liquids with gases. The system employs a distribution member capable of high gas flow rates, in which the pores are effectively sealed against the entry of water and impurities when the flow of gas therethrough is terminated. It may be used effectively and efficiently for the treatment of large bodies of water, and it requires no added structural members for support against collapse under relatively high hydrostatic pressures. The method and the system are relatively simple and inexpensive to carry out and to install and maintain, respectively.

Having thus described the invention, I claim:

1. In a method for the treatment of a liquid body with a gas, the steps comprising:
   (a) stretching a resilient, substantially cylindrical hose member and simultaneously puncturing opposite walls thereof at a multiplicity of points and at an angle of at least about 25 degrees from normal to the surface thereof to form about said hose member and over substantially its entire length a multiplicity of minute, normally closed perforations of generally circular cross section extending through said opposite walls at an angle that is at least about 25 degrees from normal to the surface thereof;
   (b) submerging said hose member in the liquid body;
   (c) passing a gas under pressure through said hose member while substantially blocking any exits for said gas from said hose member other than said perforations, to cause distension of said perforations and passage of said gas outwardly therethrough into said liquid; and
   (d) thereafter terminating the flow of said gas through said hose member whereupon the pressure of said liquid bearing upon and normal to said wall of said hose member, about the outer ends of said perforations, tightly closes said perforations and substantially prevents the entry of foreign matter from said liquid thereinto.

2. The method of claim 1 wherein said wall of said hose member is punctured at an angle of at least about 35 degrees from normal to the surface thereof.

3. The method of claim 1 wherein said gas is air and wherein said liquid body is a large body of water, said method promoting bacteriological activity in said water by oxygenation of the bacteria therein.

References Cited

UNITED STATES PATENTS

| | | | |
|---|---|---|---|
| 3,186,644 | 6/1965 | Ross et al. | 261—124 X |
| 2,771,320 | 11/1956 | Korwin | 239—534 X |
| 2,753,001 | 7/1956 | Page | 239—534 X |
| 3,293,861 | 12/1966 | Hinde | 210—15 X |
| 1,731,779 | 10/1929 | Houston | 261—122 |
| 3,063,689 | 11/1962 | Coppock | 261—124 |

FOREIGN PATENTS

| | | |
|---|---|---|
| 597,951 | 5/1960 | Canada. |

MICHAEL ROGERS, Primary Examiner

U.S. Cl. X.R.

239—534; 261—124